US010761248B2

(12) United States Patent
Diguet

(10) Patent No.: US 10,761,248 B2
(45) Date of Patent: Sep. 1, 2020

(54) INFRARED REFLECTING FILM

(71) Applicant: SAINT-GOBAIN PERFORMANCE PLASTICS CORPORATION, Solon, OH (US)

(72) Inventor: Antoine Diguet, Aubervilliers (FR)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 5 days.

(21) Appl. No.: 15/247,353

(22) Filed: Aug. 25, 2016

(65) Prior Publication Data

US 2017/0059750 A1 Mar. 2, 2017

(30) Foreign Application Priority Data

Aug. 26, 2015 (EP) ..................... 15306314

(51) Int. Cl.
G02B 5/08 (2006.01)
G02B 5/26 (2006.01)
G02B 5/28 (2006.01)

(52) U.S. Cl.
CPC ......... G02B 5/0866 (2013.01); G02B 5/0858 (2013.01); G02B 5/26 (2013.01); G02B 5/282 (2013.01)

(58) Field of Classification Search
CPC ...... G02B 5/0858; G02B 5/0866; G02B 5/26; G02B 5/282
See application file for complete search history.

(56) References Cited

U.S. PATENT DOCUMENTS

| 5,183,700 A * | 2/1993 | Austin ................ C03C 17/3435 359/359 |
| 5,296,302 A | 3/1994 | O'Shaughnessy et al. |
| 5,372,874 A | 12/1994 | Dickey et al. |
| 5,591,529 A | 1/1997 | Braatz et al. |
| 5,948,538 A | 9/1999 | Brochot et al. |
| 5,956,175 A | 9/1999 | Hojnowski |
| 6,030,671 A | 2/2000 | Yang |
| 6,210,784 B1 | 4/2001 | Rondeau et al. |
| 6,261,694 B1 | 7/2001 | Iacovangelo |
| 6,579,423 B2 | 6/2003 | Anzaki et al. |
| 6,589,658 B1 | 7/2003 | Stachowiak |
| 7,419,725 B2 | 9/2008 | Neuman et al. |
| 7,508,586 B2 | 3/2009 | Thielsch et al. |
| 7,709,095 B2 | 5/2010 | Persoone et al. |
| 7,740,946 B2 | 6/2010 | Morimoto et al. |
| 7,824,777 B2 | 11/2010 | Stoessel et al. |
| 2002/0136905 A1* | 9/2002 | Medwick ................ C03C 17/36 428/432 |
| 2004/0086723 A1 | 5/2004 | Thomsen et al. |
| 2006/0057399 A1 | 3/2006 | Persoone et al. |
| 2006/0078746 A1 | 4/2006 | Neuman et al. |
| 2007/0281178 A1 | 12/2007 | Oh et al. |
| 2007/0298265 A1 | 12/2007 | Morimoto et al. |
| 2008/0057264 A1 | 3/2008 | Morimoto et al. |
| 2008/0199670 A1 | 8/2008 | Yaoita et al. |
| 2008/0311389 A1 | 12/2008 | Roquiny et al. |
| 2009/0068384 A1 | 3/2009 | Seth et al. |
| 2009/0153989 A1 | 6/2009 | An et al. |
| 2009/0246552 A1 | 10/2009 | Stoessel et al. |
| 2010/0221575 A1 | 9/2010 | Stull |
| 2010/0316852 A1 | 12/2010 | Condo et al. |
| 2011/0135880 A1 | 6/2011 | Roman et al. |
| 2011/0212336 A1 | 9/2011 | Kawamoto et al. |
| 2011/0261442 A1* | 10/2011 | Knoll ..................... C03C 17/36 359/360 |
| 2012/0028009 A1 | 2/2012 | Gerardin et al. |
| 2012/0076986 A1 | 3/2012 | Inuduka et al. |
| 2012/0152347 A1 | 6/2012 | Lee et al. |
| 2014/0022630 A1 | 1/2014 | Reymond et al. |
| 2014/0322507 A1* | 10/2014 | Ding ....................... G02F 1/091 428/216 |
| 2015/0015940 A1 | 1/2015 | Nakajima |
| 2015/0103398 A1 | 4/2015 | Banerjee et al. |
| 2015/0183301 A1 | 7/2015 | Diguet et al. |
| 2017/0254936 A1* | 9/2017 | Morita ................... G02B 5/208 |

FOREIGN PATENT DOCUMENTS

| CN | 1708700 A | 12/2005 |
| CN | 101211735 A | 7/2008 |
| CN | 101243022 A | 8/2008 |
| CN | 101866063 A | 10/2010 |
| CN | 102483480 A | 5/2012 |
| CN | 104136946 A | 11/2014 |
| DE | 69510488 T2 | 2/2000 |
| EP | 1174397 A2 | 1/2002 |
| EP | 2030954 A1 | 3/2009 |
| EP | 1642159 B1 | 7/2013 |
| GB | 498503 A | 1/1939 |
| JP | 2000214304 A | 8/2000 |
| JP | 2008036864 A | 2/2008 |
| JP | 2009071146 A | 4/2009 |
| TW | 200804214 A | 1/2008 |
| WO | 9928258 A1 | 6/1999 |
| WO | 2006/122900 A1 | 11/2006 |

(Continued)

OTHER PUBLICATIONS

Extended European Search Report for EP Application No. 14877504. 2, dated Jun. 9, 2017, 10 pages.

(Continued)

Primary Examiner — George G King
(74) Attorney, Agent, or Firm — Abel Schillinger, LLP; Chi Suk Kim

(57) ABSTRACT

The invention relates to an infrared reflecting film comprising a flexible polymer substrate; a heat-mirror stack on the substrate, said heat-mirror stack comprising a first dielectric oxide layer, a second dielectric oxide layer and a silver-containing layer between the first and second dielectric oxide layers; and an optical stack on the heat mirror stack, said optical stack comprising alternating layers of at least one layer of a first type and at least one layer of a second type, wherein each layer of the first type has a refractive index measured at 550 nm of 1.6 or less and each layer of the second type has a refractive index measured at 550 nm of 2.3 or more.

8 Claims, No Drawings

(56) References Cited

FOREIGN PATENT DOCUMENTS

| WO | 2007028060 A2 | 3/2007 |
|---|---|---|
| WO | 2007120177 A1 | 10/2007 |
| WO | 2009120175 A1 | 10/2009 |
| WO | 2013053608 A1 | 4/2013 |
| WO | 2013087064 A1 | 6/2013 |
| WO | 2014191472 A1 | 12/2014 |
| WO | 2015102923 A1 | 7/2015 |

OTHER PUBLICATIONS

International Search Report and Written Opinion for PCT Application No. PCT/US2016/048655, dated Dec. 13, 2016, 12 pages.
International Search Report from PCT/US2014/071123 dated Mar. 26, 2015, 1 page.
Extended European Search Report for EP Application No. 15306314.4, dated Feb. 18, 2016, 7 pages.
Dai Dahuang, "Functional Thin Film and Its Deposition Preparation Technology," Beijing: Metallurgical Technology Press, Jan. 2013, pp. 357-358.

* cited by examiner

INFRARED REFLECTING FILM

CROSS-REFERENCE TO RELATED APPLICATION

The current application claims priority to European Patent Application No. 15306314.4, filed Aug. 26, 2015, entitled "Infrared Reflecting Film," naming as inventor Antoine Diguet, which application is incorporated by reference herein in its entirety.

FIELD OF THE DISCLOSURE

Embodiments of the present invention relate to infrared reflecting films and the use thereof for improving the solar control function of glazings.

BACKGROUND

Solar control window films are widely used in the automotive and building industries for improving insulation of glazings as well as offering new possibilities of aesthetic modifications. Solar control function is based on near IR light absorption or reflection. Heat reflectors are usually the most selective and based on stacks of alternating dielectric and metal layers.

US 2006/0057399 discloses a solar control film comprising three metal oxide layers and two silver-containing layers, each interposed between two of the metal oxide layers. Such an infrared reflecting layered structure has superior performances compared with a stack comprising a single silver-containing layer with higher thickness. Indeed, the increase of the thickness of the silver-containing layer leads to a rapid increase of the visible light reflectance which is not acceptable in particular for window films functionalization for car industry for which the visible light reflectance has to be maintained below 15%. However, this stack is more expensive to produce, in particular due to higher amounts of silver used. In addition, the higher the amount of silver, the lower the film is resistant to corrosion.

It is thus an object of certain embodiments of the present disclosure to avoid the drawbacks of the prior art by providing an infrared reflecting film comprising one single silver-containing layer and having improved solar control properties.

DETAILED DESCRIPTION

According to a first aspect of the present invention, an infrared reflecting film is provided. The infrared reflecting film comprises:
 a flexible polymer substrate;
 a heat-mirror stack on the substrate, said heat-mirror stack comprising a first dielectric oxide layer, a second dielectric oxide layer and a silver-containing layer between the first and second dielectric oxide layers; and
 an optical stack on the heat mirror stack, said optical stack comprising alternating layers of at least one layer of a first type and at least one layer of a second type, wherein each layer of the first type has a refractive index of 1.6 or less and each layer of the second type has a refractive index of 2.3 or more.

The heat mirror stack as well as the film can comprise only one metallic layer having infrared reflecting properties, i.e. the silver-containing layer of the heat mirror stack. Indeed, the Applicant has unexpectedly found that the combination of a heat mirror stack with a specific optical stack could provide similar optical and solar control properties, if not better, than a film comprising two or more metal layers having infrared reflecting properties as disclosed for example in US 2006/0057399.

In certain embodiments, the film has a visible light transmission of 70% or more, such as 73% or more, a total solar energy rejection of 50% or more, such as 55% or more, a visible light reflectance of 14% or less, a light to solar heat gain coefficient of 1.50 or more, such as 1.65 or more, or even 1.70 or more and a solar heat gain coefficient of 0.5 or less, such as 0.44 or less.

The Visible Light Transmittance (VLT) is the amount of visible light that passes through the glazing system, expressed as a percentage of the total visible light. A higher rating may improve natural light transmission.

The Total Solar Energy Rejection (TSER) is the percentage of solar energy in the form of visible light, infrared radiation and ultraviolet light rejected by the film. The higher the TSER number, the more solar energy is rejected away from the window.

The Visible Light Reflectance (VLR) is the amount of visible light that is reflected by the glazing system, expressed as a percentage of the total visible light. Films with higher ratings tend to be more reflective and/or darker.

The Light to Solar Heat Gain Coefficient (LSHGC), defined as VLT/(100−TSER), provides a gauge of the relative efficiency of different glass or glazing types in transmitting daylight while blocking heat gains. The higher the number, the more light transmitted without adding excessive amounts of heat.

The Solar Heat Gain Coefficient (SHGC), defined as (100−TSER)/100, represents the part of solar energy directly transmitted or absorbed and re-radiated. It is expressed as a number between 0 and 1. The lower the SHGC, the better the solar control properties of the film.

The VLT and VLR, also called respectively light transmittance and light reflectance, and the TSER, corresponding to 1-g wherein g is the total solar energy transmittance, are measured according the standard ISO 9050:2003.

In the context of the present invention, by the terms "on" and "under" when related to the relative position of one layer or stack to another, it is meant that said layer or stack is more distant from or closer to, respectively, the substrate than the other one. It is not meant that said layers or stacks are directly contacting each other, without excluding this possibility. In particular, additional layers may be present between said layers or stacks. On the contrary, the expression "direct contact" when related to the relative position of one layer or stack to another means that no additional layer is disposed between said layers or stacks.

The expression "based on" when referring to the composition of a layer means that said layer comprises more than 80%, such as more than 90%, or even more than 95% by weight of said material. Said layer may be essentially made of said material.

In the present application, the refractive indexes are measured at 550 nm.

In particular embodiments, the stack can be disposed on a substrate, such as a flexible polymer substrate. The flexible polymer substrate can be for example made of a polymer selected from the group consisting of polyethylene terephtalate, polyethylene naphtalate, polyurethane, polyvinyl butyral, ethylene-vinyl acetate, fluorinated polymers such as ethylene tetrafluoroethylene, or cellulose resin. The flexible polymer substrate may comprise a hard coat, for example based on acrylate polymer and/or silica nanoparticles, on at least one surface, generally the lower surface, i.e. the surface not in contact with the heat mirror stack. The thickness of the flexible polymer substrate may be from 5 to 200 μm.

The heat-mirror stack can include a first dielectric oxide layer, a second dielectric oxide layer and a silver-containing layer between the first and second dielectric oxide layers. The first and second dielectric oxide layers may have a reflective index from 1.7 to 2.6, such as from 2.3 to 2.6. They may be independently based on titanium oxide, niobium oxide, bismuth oxide, lead oxide, zirconium oxide or barium titanate. The first and second dielectric oxide layers can be made of essentially the same material. Each of the first and second dielectric layers may have a thickness from 20 to 60 nm. The thickness of the two dielectric oxide layers may be identical or different.

The silver-containing layer contains more than 80%, such as more than 90%, or even more than 95% by weight of silver. It may comprise other metals selected from gold, zinc, copper, aluminum, tin, indium, titanium, chromium, nickel, niobium, rhodium, platinum and palladium. In an embodiment, the silver-containing layer can be essentially made of silver. In another embodiment, the silver-containing layer is made of more than 90% by weight of silver and up to 10% by weight of gold. The silver-containing layer can have a physical thickness from 12 to 20 nm, such as 13 to 14 nm.

The heat mirror stack may further include a blocking layer between the silver-containing layer and at least one of the first and second dielectric oxide layers. In a particular embodiment, the heat mirror stack can include a first blocking layer between the first dielectric oxide layer and the silver-containing layer, and a second blocking layer between the silver-containing layer and the second dielectric oxide layer. The blocking layer(s) can be in direct contact with the silver-containing layer. The first and/or second blocking layer may be based on gold, titanium, niobium, nickel, chromium or an alloy thereof such as an alloy of nickel and chromium. The first and/or second blocking layer can have a physical thickness from 0.1 to 2 nm, such as from 0.5 to 1 nm. As used herein, it should be noted that due to its low thickness, the blocking layer may not be considered as a metallic layer having infrared reflecting properties.

The heat mirror stack may further include a wetting layer under and/or on the silver-containing layer. In a first embodiment, one wetting layer is disposed between the first dielectric oxide layer and the silver-containing layer. In an embodiment, a first wetting layer can be disposed between the first dielectric oxide layer and the silver-containing layer, and a second wetting layer can be disposed between the silver-containing layer and the second dielectric oxide layer. When disposed under the silver-containing layer, the wetting layer can improve the quality of the silver-containing layer. When disposed on the silver-containing layer, the wetting layer can contribute to protecting the silver-containing layer during the deposition of the upper layers. The wetting layer(s) can be in direct contact with the silver-containing layer. Nevertheless, when present, the blocking layer(s) can be inserted between the wetting layer(s) and the silver-containing layer and thereby in direct contact with those two layers. The wetting layer(s) may be based on zinc oxide. Preferably, the wetting layer(s) can be based on aluminum doped zinc oxide. Each wetting layer can have a physical thickness from 1 to 10 nm.

The optical stack can include alternating layers of at least one layer of a first type and at least one layer of a second type, wherein each layer of the first type has a refractive index of 1.6 or less and each layer of the second type has a refractive index of 2.3 or more. It may comprise at least two layers of the first type and at least two layers of the second type. The optical stack may start with a layer of the first type on the heat mirror stack. In one embodiment, the optical stack consists in a layer of the first type on the heat mirror stack and a layer of the second type on the layer of the first type. In another embodiment, the optical stack consists in a first layer of the first type on the heat mirror stack, a first layer of the second type on the first layer of the first type, a second layer of the first type on the first layer of the second type and a second layer of the second type on the second layer of the first type. Preferably, the first layer of the first type can be in direct contact with the second dielectric oxide layer of the heat mirror stack.

The layer(s) of the first type can have a refractive index of 1.6 or less, typically from 1.3 to 1.55. The layer(s) of the first type may be made of material based on silicon oxide or magnesium fluoride. Preferably, all layers of the first type can be made of essentially the same material. Each layer of the first type may have a thickness from 60 to 170 nm. When the optical stack comprises only one layer of the first type, said layer of the first type can advantageously have a thickness form 60 to 130 nm. When the optical stack comprises two layers of the first type, the first layer of the first type can advantageously have a thickness form 60 to 120 nm, and the second layer of the first type can have a thickness from 100 to 170 nm.

The layer(s) of the second type can have a refractive index of 2.3 or more, such as from 2.4 to 2.6. The layer(s) of the second type may be made of material based on titanium oxide, niobium oxide, bismuth oxide, lead oxide, zirconium oxide or barium titanate. In an embodiment, all layers of the second type are made of essentially the same material. Each layer of the second type may have a thickness from 50 to 120 nm. When the optical stack comprises only one layer of the second type, said layer of the second type can have a thickness from 70 to 120 nm. When the optical stack comprises two layers of the second type, the first layer of the second type can have a thickness form 50 to 110 nm, and the second layer of the second type has advantageously a thickness from 70 to 120 nm.

In a particular embodiment, the film can include, in the following order starting from a flexible polymer substrate:
  a first dielectric oxide layer;
  optionally, a first wetting layer;
  a first blocking layer;
  a silver-containing layer;
  a second blocking layer;
  optionally, a second wetting layer;
  a second dielectric oxide layer;
  a layer of the first type having a refractive index of 1.6 or less;
  a layer of the second type having a refractive index of 2.3 or more;
  optionally, a second layer of the first type having a refractive index of 1.6 or less and a second layer of the second type having a refractive index of 2.3 or more;

The film can include a counter flexible polymer substrate on the optical stack. The durability of the film may be significantly improved when the stack comprising the silver-containing layer is encapsulated between two flexible polymer substrates. Similar to the flexible polymer substrate, the counter flexible polymer substrate may be made of a polymer selected from the group consisting of polyethylene terephtalate, polyethylene naphtalate, polyurethane, polyvinyl butyral, ethylene-vinyl acetate, fluorinated polymers such as ethylene tetrafluoroethylene, or cellulose resin. The flexible polymer substrate and the counter flexible polymer substrate may be made of the same material or may be made of different materials. The counter flexible polymer substrate may comprise UV absorbing agents. The counter flexible polymer substrate may further comprise a hard coat, for example based on acrylate polymer and/or silica nanoparticles, on its upper surface, i.e. the surface not in contact with the optical stack. The thickness of the counter flexible polymer substrate may be from 10 to 100 μm.

The film may be provided on the one of its surface, generally the surface opposite to the flexible polymer substrate, with a pressure sensitive adhesive layer.

Examples of infrared reflecting films according to specific embodiments of the disclosure may comprise the following stacks of layers:

PET/$TiO_x$/Au/Ag/Au/$TiO_x$/$SiO_x$/$TiO_x$/PET
PET/$TiO_x$/Al:$ZnO_x$/Au/Ag/Au/$TiO_x$/$SiO_x$/$TiO_x$/PET
PET/$TiO_x$/Al:$ZnO_x$/Au/Ag/Au/Al:$ZnO_x$/$TiO_x$/$SiO_x$/$TiO_x$/PET
PET/$TiO_x$/Au/Ag/Au/$TiO_x$/$SiO_x$/$TiO_x$/$SiO_x$/$TiO_x$/PET
PET/$TiO_x$/Al:$ZnO_x$/Au/Ag/Au/$TiO_x$/$SiO_x$/$TiO_x$/$SiO_x$/$TiO_x$/PET
PET/$TiO_x$/Al:$ZnO_x$/Au/Ag/Au/Al:$ZnO_x$/$TiO_x$/$SiO_x$/$TiO_x$/$SiO_x$/$TiO_x$/PET

In another aspect, certain embodiments of the present disclosure relate to a method for manufacturing the infrared reflecting film described herein. The method can include the steps of:

providing a flexible polymeric substrate;

depositing a heat-mirror stack on said substrate, said heat-mirror stack comprising a first dielectric oxide layer, a second dielectric oxide layer and a silver-containing layer between the first and second dielectric oxide layers;

depositing an optical stack on said heat mirror stack, said optical stack comprising alternating layers of at least one layer of a first type and at least one layer of a second type, wherein each layer of the first type has a refractive index of 1.6 or less and each layer of the second type has a refractive index of 2.3 or more;

The thin layers forming the heat mirror stack and the optical stack can be deposited by sputtering method or chemical vapor deposition (CVD) with appropriate coaters. In the sputtering method, especially a magnetron sputtering method, excited species of a plasma tear off the atoms of a target placed facing the substrate to be coated. The CVD process is a pyrolysis process based on gaseous precursors that decompose under the effect of the heat of the substrate. The layers of the first and second type can be deposited by CVD process, in particular plasma enhanced CDV (PECVD) or magnetron plasma enhanced CVD (mag-PECVD), for higher deposition rates.

The thin layers can generally be deposited on the flexible polymer substrate in the appropriate order (i.e. starting from the substrate: the first dielectric oxide layer, the silver-containing layer, the second dielectric oxide layer and then alternatively a layer of a first type and a layer of a second type). When the film comprises a counter flexible polymer substrate, the counter flexible polymer substrate may be laminated on the optical stack though an adhesive layer. In an alternative embodiment, the thin layers forming the heat mirror stack and the optical stack may be deposited, in the reverse order, on the counter flexible polymer substrate, and the flexible polymer substrate may be laminated on the heat mirror stack though an adhesive layer. In another alternative, the thin layers forming the heat mirror may be deposited on the flexible polymer layer, the thin layers forming the optical stack may be deposited under the counter flexible polymer substrate, then the two stacks may be laminated together so as to contact the heat mirror stack and the optical stack though an adhesive layer.

In another aspect, certain embodiments of the present disclosure relate to a glazing, such as a building glazing or a vehicle glazing, comprising the infrared reflecting film described herein. The glazing may be a single or a multiple glazing, in particular a double or triple glazing. The film of the present invention may be provided on the surface of the glazing facing the outside or on the surface of the glazing facing the inside, provided that the optical stack before is closer to the incident solar radiation than the heat mirror stack. Accordingly, the film may be provided on the glazing either by contacting the surface of the film closest to flexible polymer substrate with the surface of the glazing facing the outside, or by contacting the surface of the film furthest from the flexible polymer substrate with the surface of the glazing facing the inside.

In another aspect, certain embodiments of the present disclosure relate to a method for manufacturing a glazing comprising the steps of providing the infrared reflecting film as described herein; and depositing the infrared reflecting film on the surface of the glazing. The film may be laminated on the glazing and adhered to the glazing through a pressure sensitive adhesive layer.

In another aspect, certain embodiments of the present disclosure relate to a method for improving the solar control of a glazing, such as building glazings or vehicle glazings, comprising the steps of providing the infrared reflecting film as described herein; and depositing the infrared reflecting film on the surface of the glazing.

In another aspect, certain embodiments of the present disclosure relate to a method for tinting a glazing, such as building glazings or vehicle glazings, comprising the steps of providing the infrared reflecting film as described herein; and depositing the infrared reflecting film on the surface of the glazing.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

An infrared reflecting film comprising: a flexible polymer substrate; a heat-mirror stack on the substrate, said heat-mirror stack comprising a first dielectric oxide layer, a second dielectric oxide layer and a silver-containing layer between the first and second dielectric oxide layers; and an optical stack on the heat mirror stack, said optical stack comprising alternating layers of at least one layer of a first type and at least one layer of a second type, wherein each layer of the first type has a refractive index measured at 550 nm of 1.6 or less and each layer of the second type has a refractive index measured at 550 nm of 2.3 or more.

Embodiment 2

The film according to embodiment 1, wherein each layer of the first type has a thickness from 60 to 170 nm.

Embodiment 3

The film according to any one of embodiment 1 or 2, wherein each layer of the second type has a thickness from 50 to 120 nm.

Embodiment 4

The film according to any one of embodiments 1 to 3, wherein the optical stack comprises at least two layers of the first type and at least two layers of the second type.

Embodiment 5

The film according to any one of embodiments 1 to 4, wherein each of the first and second dielectric oxide layers have a thickness from 20 to 60 nm.

Embodiment 6

The film according to any one of embodiments 1 to 5, wherein the heat mirror stack comprises a blocking layer between the silver-containing layer and at least one of the first and second dielectric oxide layers, said blocking layer being in direct contact with the silver-containing layer.

Embodiment 7

The film according to embodiment 6, wherein the blocking layer has a physical thickness from 0.1 to 1 nm.

Embodiment 8

The film according to any one of embodiments 1 to 7, wherein the heat mirror stack comprises a wetting layer under and/or on the silver-containing layer, and in direct contact with the silver-containing layer, or if present with the blocking layer.

Embodiment 9

The film according to embodiment 8, wherein the wetting layer has a physical thickness from 1 to 10 nm.

Embodiment 10

The film according to any one of embodiments 1 to 9 comprising a counter polymer flexible substrate on the optical stack.

Embodiment 11

The film according to any one of embodiments 1 to 10, wherein each layer of the first type is based on silicon oxide or magnesium fluoride.

Embodiment 12

The film according to any one of embodiments 1 to 11, wherein each layer of the second type is based on titanium oxide, niobium oxide, bismuth oxide, lead oxide, zirconium oxide or barium titanate.

Embodiment 13

The film according to any one of embodiments 1 to 12, wherein the first and second dielectric oxide layers are based on titanium oxide, niobium oxide, bismuth oxide, lead oxide, zirconium oxide or barium titanate.

Embodiment 14

The film according to any one of embodiments 1 to 13, wherein the silver-containing layer has a physical thickness from 12 to 20 nm.

Embodiment 15

A glazing comprising the infrared reflecting film according to any one of embodiments 1 to 14.

The infrared reflecting film according to particular embodiments of the present disclosure will now be illustrated with the following non-limiting examples.

EXAMPLES

Four infrared reflecting films have been prepared. Examples A and B are infrared reflecting films according to the invention comprising a heat mirror stack and an optical stack. Comparative example C-1 is an infrared reflecting films comprising only one heat mirror stack (i.e. only one metallic layer having infrared reflecting properties) without optical stack. Comparative example C-2 is an infrared reflective film according to US 2006/0057399 (i.e. comprising two metallic layer having infrared reflecting properties).

The thin layers have been deposited by magnetron sputtering on a PET substrate and a counter PET substrate has been laminated on the opposite surface of the PET substrate.

Table 1 shows the operating conditions for the magnetron sputtering deposition for each type of layer. Table 2 shows the compositions, the order and the thickness of the layers of the stacks for each sample as well as the refractive indexes (IR) of the materials measured at 550 nm.

TABLE 1

| Layer | Target | Operating pressure | Gas |
| --- | --- | --- | --- |
| TiOx | TiOx | 2 μBar | Ar + O2 (3 mol %) |
| Au | Au | 8 μBar | Ar |
| Ag | Ag | 8 μBar | Ar |
| SiOx | Si—Al 8% wt | 2 μBar | Ar + O2 (52 mol %) |

TABLE 2

| | Thickness (nm) | | | |
| --- | --- | --- | --- | --- |
| Composition (IR) | A | B | C-1 | C-2 |
| Counter PET substrate | 25 μm | 25 μm | 25 μm | 25 μm |
| TiOx (2.4) | — | 97 | — | — |
| SiOx (1.5) | — | 141 | — | — |
| TiOx (2.4) | 101 | 81 | — | 27 |
| SiOx (1.5) | 85 | 85 | — | — |
| Au | — | — | — | 0.5 |
| Ag | — | — | — | 10 |
| Au | — | — | — | 0.5 |
| TiOx (2.4) | 30 | 30 | 30 | 60 |
| Au | 0.6 | 0.6 | 0.6 | 0.5 |
| Ag | 14 | 14 | 14 | 10 |
| Au | 0.6 | 0.6 | 0.6 | 0.5 |
| TiOx (2.4) | 30 | 30 | 30 | 27 |
| PET Substrate | 50 μm | 50 μm | 50 μm | 50 μm |

The VLT, VLR, TSER, LSHGC and SHGC for each film have been determined according to standard ISO 9050:2003.

The colors in transmission and in reflection (referred to "int" for the reflection on the PET substrate side and "ext" for the reflection on the counter PET substrate side) of the films have been measured using illuminant D65 and the reference observer CIE-1931.

The results are summarized in Table 3.

TABLE 3

|         | A     | B     | C-1   | C-2   |
|---------|-------|-------|-------|-------|
| VLT (%) | 76.7  | 77.5  | 70.5  | 72.7  |
| a*      | −2.91 | −2.11 | −3.93 | −2.17 |
| b*      | −0.70 | 1.68  | −2.66 | 4.47  |
| VLR (%)int | 12.9 | 12.2 | 20.1 | 11.8 |
| a* int  | 6.80  | 3.87  | 7.65  | −2.21 |
| b*int   | −1.31 | −9.47 | 4.60  | −8.36 |
| VLR (%)ext | 13.0 | 13.5 | 19.8 | 11.1 |
| a*ext   | 3.28  | −1.80 | 7.81  | −3.43 |
| b*ext   | −3.50 | −8.50 | 5.19  | −4.54 |
| TSER (%)| 54.3  | 57.7  | 50.2  | 54.6  |
| LSHGC   | 1.68  | 1.83  | 1.42  | 1.60  |
| SHGC    | 0.40  | 0.42  | 0.50  | 0.45  |

Contrary to the infrared reflective film of comparative examples C-1, the infrared reflective films of examples according to embodiments of the present disclosure have VLR values below 15%. In addition, the VLT and TSER values are also significantly improved.

The infrared reflective films of examples according to the embodiments of the disclosure have similar optical and solar control properties to the film of comparative example C-2 according to US 2006/0057399, if not better in particular in term of VLT, leading to very high LSHGC and low SHGC.

Finally, it was found that the colors in reflection are acceptable for all the films of the comparative examples and the films according to embodiments of the present disclosure.

What is claimed is:

1. An infrared reflecting film comprising:
   a flexible polymer substrate;
   a heat-mirror stack on the substrate, said heat-mirror stack comprising a first dielectric oxide layer contacting the substrate, a blocking layer contacting the first dielectric oxide layer, a silver-containing layer contacting the blocking layer, and a second dielectric oxide layers overlying the silver-containing layer, wherein the silver-containing layer has a physical thickness from 12 nm to 20 nm, wherein each of the first and second dielectric oxide layers have a thickness from 20 to 60 nm, wherein the blocking layer comprises gold, or an alloy thereof, and wherein the blocking layer has a thickness of from 0.1 nm to 2 nm; and
   an optical stack on the heat mirror stack, said optical stack comprising at least two stacks of alternating layers, wherein each stack of alternating layers consists of one layer of a first type and one layer of a second type, wherein each layer of the first type has a refractive index measured at 550 nm of 1.6 or less and each layer of the second type has a refractive index measured at 550 nm of 2.3 or more, wherein each layer of the second type has a thickness from 50 to 120 nm,
   wherein the infrared reflecting film has a visible light transmission of 70% or more and a visible light reflectance of 14% or less.

2. The film according to claim 1, wherein each layer of the first type has a thickness from 60 to 170 nm.

3. The film according to claim 1, wherein the film further comprises a counter polymer flexible substrate on the optical stack.

4. The film according to claim 1, wherein each layer of the first type is based on silicon oxide or magnesium fluoride.

5. The film according to claim 1, wherein each layer of the second type is based on titanium oxide, niobium oxide, bismuth oxide, lead oxide, zirconium oxide or barium titanate.

6. The film according to claim 1, wherein the first and second dielectric oxide layers are based on titanium oxide, niobium oxide, bismuth oxide, lead oxide, zirconium oxide or barium titanate.

7. A glazing comprising an infrared reflecting film, wherein the infrared reflecting film comprises:
   a flexible polymer substrate;
   a heat-mirror stack on the substrate, said heat-mirror stack comprising a first dielectric oxide layer contacting the substrate, a silver-containing layer contacting the first dielectric oxide layer, a blocking layer contacting the silver-containing layer, and a second dielectric oxide layers contacting the blocking layer, wherein the silver-containing layer has a physical thickness from 12 nm to 20 nm, wherein each of the first and second dielectric oxide layers have a thickness from 20 to 60 nm, wherein the blocking layer comprises gold, or an alloy thereof, and wherein the blocking layer has a thickness of from 0.1 nm to 2 nm; and
   an optical stack on the heat mirror stack, said optical stack comprising at least two stacks of alternating layers, wherein each stack of alternating layers consists of one layer of a first type and one layer of a second type, wherein each layer of the first type has a refractive index measured at 550 nm of 1.6 or less and each layer of the second type has a refractive index measured at 550 nm of 2.3 or more, wherein each layer of the second type has a thickness from 50 to 120 nm
   wherein the infrared reflecting film has a visible light transmission of 70% or more and a visible light reflectance of 14% or less.

8. The glazing according to claim 7, wherein each layer of the first type has a thickness from 60 to 170 nm.

* * * * *